(12) United States Patent
Almalki et al.

(10) Patent No.: US 8,676,528 B2
(45) Date of Patent: Mar. 18, 2014

(54) SYSTEM AND METHOD FOR CALIBRATING AN ACCELEROMETER

(75) Inventors: Nazih Almalki, Kitchener (CA); Christopher Harris Snow, Kitchener (CA)

(73) Assignee: Blackberry Limited, Waterloo (CA)

( * ) Notice: Subject to any disclaimer, the term of this patent is extended or adjusted under 35 U.S.C. 154(b) by 522 days.

(21) Appl. No.: 13/023,276

(22) Filed: Feb. 8, 2011

(65) Prior Publication Data

US 2012/0203486 A1  Aug. 9, 2012

(51) Int. Cl.
*G01C 17/38* (2006.01)

(52) U.S. Cl.
CPC .................................. *G01C 17/38* (2013.01)
USPC .......................................................... 702/96

(58) Field of Classification Search
USPC ............................ 702/96, 150, 155, 182–185
See application file for complete search history.

(56) References Cited

U.S. PATENT DOCUMENTS

| | | | |
|---|---|---|---|
| 5,151,872 A | 9/1992 | Suzuki et al. |
| 5,297,065 A | 3/1994 | Cage et al. |
| 5,581,899 A | 12/1996 | Breher et al. |
| 5,694,037 A | 12/1997 | Palstra et al. |
| 5,737,226 A | 4/1998 | Olson et al. |
| 6,130,534 A | 10/2000 | Huang et al. |
| 6,286,221 B1 | 9/2001 | Voto et al. |
| 6,408,251 B1 | 6/2002 | Azuma |
| 6,543,146 B2 | 4/2003 | Smith et al. |
| 6,857,194 B2 | 2/2005 | Parks et al. |
| 6,871,411 B1 | 3/2005 | Kang et al. |
| 6,922,647 B2 | 7/2005 | Cho et al. |
| 7,053,608 B2 | 5/2006 | Friend et al. |
| 7,119,533 B2 | 10/2006 | Tamura et al. |
| 7,127,823 B2 | 10/2006 | Parks et al. |
| 7,146,740 B2 | 12/2006 | Manfred |
| 7,191,533 B2 | 3/2007 | Parks et al. |
| 7,210,236 B2 | 5/2007 | Sato et al |
| 7,249,419 B2 | 7/2007 | Sato |
| 7,275,008 B2 | 9/2007 | Plyvanainen |

(Continued)

FOREIGN PATENT DOCUMENTS

| | | |
|---|---|---|
| JP | 2008-241675 A | 10/2008 |
| WO | WO 2007/026238 A1 | 3/2007 |
| WO | WO 2008/068542 A1 | 6/2008 |

OTHER PUBLICATIONS

Extract from "Calibrating the Digital Compass on the HTC Magic"; Mar. 16, 2010; http://www.androidza.co.za/calibrating-the-digital-compass-on-the-htc-magic/.

(Continued)

*Primary Examiner* — Edward Raymond
(74) *Attorney, Agent, or Firm* — Brett J. Slaney; Blake, Cassels & Graydon LLP

(57) ABSTRACT

A method and system are provided for obtaining data for calibrating an accelerometer. The method and system operate by using at least one magnetometer reading to detect that a first orientation is being maintained; obtaining a plurality of accelerometer readings at the first orientation; using at least one magnetometer reading to detect that a plurality of additional orientations are being maintained and, for each orientation, obtaining a plurality of accelerometer readings at that orientation; determining calibration parameters comprising, for each axis of the accelerometer, at least one of a gain value and an offset value, using the plurality of accelerometer readings at the first and plurality of additional orientations; and applying the calibration parameters to subsequent accelerometer readings.

27 Claims, 12 Drawing Sheets

(56) References Cited

U.S. PATENT DOCUMENTS

| | | | |
|---|---|---|---|
| 7,322,117 | B2 | 1/2008 | Olson et al. |
| 7,324,906 | B2 | 1/2008 | Sato et al. |
| 7,331,115 | B2 | 2/2008 | Schierbeek et al. |
| 7,346,995 | B2 | 3/2008 | Olson et al. |
| 7,353,614 | B2 | 4/2008 | Parks et al. |
| 7,363,718 | B2 | 4/2008 | Sato et al. |
| 7,451,549 | B1 | 11/2008 | Sodhi et al. |
| 7,458,166 | B2 | 12/2008 | Parks et al. |
| 7,532,991 | B2 | 5/2009 | Handa |
| 7,613,581 | B2 | 11/2009 | Skvortsov et al. |
| 7,637,024 | B2 | 12/2009 | Amundsen et al. |
| 7,643,939 | B2 | 1/2010 | Zeng et al. |
| 7,676,341 | B2 | 3/2010 | Handa |
| 7,814,671 | B2 | 10/2010 | Okeya |
| 7,818,136 | B2 | 10/2010 | Chen et al. |
| 7,835,879 | B2 | 11/2010 | Vocali et al. |
| 2002/0092188 | A1 | 7/2002 | Smith |
| 2003/0023380 | A1 | 1/2003 | Woloszyk et al. |
| 2007/0156337 | A1 | 7/2007 | Yanni |
| 2008/0243417 | A1 | 10/2008 | Yanni et al. |
| 2008/0270060 | A1 | 10/2008 | Dunne |
| 2009/0070056 | A1 | 3/2009 | Vocali et al. |
| 2009/0070057 | A1 | 3/2009 | Hirobe et al. |
| 2009/0167295 | A1 | 7/2009 | Chen et al. |
| 2009/0254294 | A1 | 10/2009 | Dutta |
| 2010/0109950 | A1 | 5/2010 | Roh |
| 2010/0121599 | A1 | 5/2010 | Boeve et al. |
| 2010/0307015 | A1 | 12/2010 | Mayor et al. |
| 2010/0307016 | A1 | 12/2010 | Mayor et al. |
| 2010/0312509 | A1 | 12/2010 | Patel et al. |
| 2010/0312510 | A1 | 12/2010 | Piemonte et al. |
| 2010/0312513 | A1 | 12/2010 | Mayor et al. |
| 2011/0077889 | A1* | 3/2011 | Vogt ................. 702/93 |

OTHER PUBLICATIONS

Extract from Honeywell Magnetic Sensor Products, Electronic Compass Design Guide Using the HMC5843 Digital Compass IC; Online at least as early as Oct. 2010; Honeywell; Online at corvusm3.googlecode.com/files/DesignGuide5843revB.pdf.

Pylvanainen, T.; Abstract from "Automatic and adaptive calibration of 3D field sensors"; Applied Mathematical Modelling; Apr. 2008; vol. 32, Issue 4.

Extract from Honeywell Design Guide: Electronic Compass Design Guide / Using the HMC5843 Digital Compass IC; Jun. 2010; Honeywell; Online at http://www51.honeywell.com/aero/common/documents/myaerospacecatalog-documents/Defense_Brochures-documents/HMC5843.pdf.

Valenti, C.; Microchip AN996: Designing a Digital Compass Using the PIC18F2520; Jul. 1, 2005; Microchip Technology Inc.; Online at http://ww1.microchip.com/downloads/en/AppNotes/00996a.pdf.

Motodev>Products>Milestone™ A853; Online at least as early as Oct. 2010; Online at http://developer.motorola.com/products/milestone-a853/.

Borgmann, J. et al.; Abstract from "Compensation techniques for HTS-rf-SQUID magnetometers operating in unshielded environments"; Applied Superconductivity; Jul. 12, 1997; vol. 5, Issues 7-12; Elsevier Science Ltd.

Včelák, J. et al.; Abstract from "Errors of AMR compass and methods of their compensation"; Sensors and Actuators A: Physical; May 24, 2006; Elsevier Science Ltd.; EMSA 2004—Selected Papers from the 5th European Magnetic Sensors & Actuators Conference—EMSA 2004, Cardiff, UK, Jul. 4-6, 2004.

Premerlani, W.; "Magetometer Offset Cancellation: Theory and Implementation"; Apr. 11, 2010; Online at gentlenav.googlecode.com/files/MagnetometerOffsetNulling.pdf.

ESA Science & Technology: Instruments; Jan. 20, 2011; European Space Agency; http://sci.esa.int/science-e/www/object/printfriendly.cfm?fobjectid=33964&fbodylongid=1443.

Burkhalter, K.; Extract from blog "iPhone 3GS Compass Calibration"; Jul. 3, 2009; http://www.iphonelife.com/blog/2440/iphone-3gs-compass-calibration.

Magnetometer with magnetoresistive sensor KMZ10 / KMZ51; Honeywell Sensors HMC1001-HMC1002-HMC1021-HMC1022; published at least as early as Oct. 6, 2010.

Vissiere, D. et al.; "Using magnetic disturbances to improve IMU-based position estimation"; 2007; Proceedigs of the European Control Conference, Jul. 2-5, 2007, Kos, Greece; pp. 2853 to 2858.

Dorveaux, E.; "Iterative calibration method for inertial and magnetic sensors"; 2009; Joint 48th IEEE Conference on Decision and Control, 28th Chinese Control Conference, Dec. 16-18, 2010, Shanghai, China.

Esfandyari, J. et al.; "MEMS pressure sensors in pedestrian navigation"; Dec. 1, 2010; Online at http://www.sensorsmag.com/electronics-computers/consumer/mems-pressure-sensors-pedestrian-navigation-7896.

Robinson, Mark; Search Report from corresponding European Application No. 11153731.2; search completed Jun. 22, 2011.

* cited by examiner

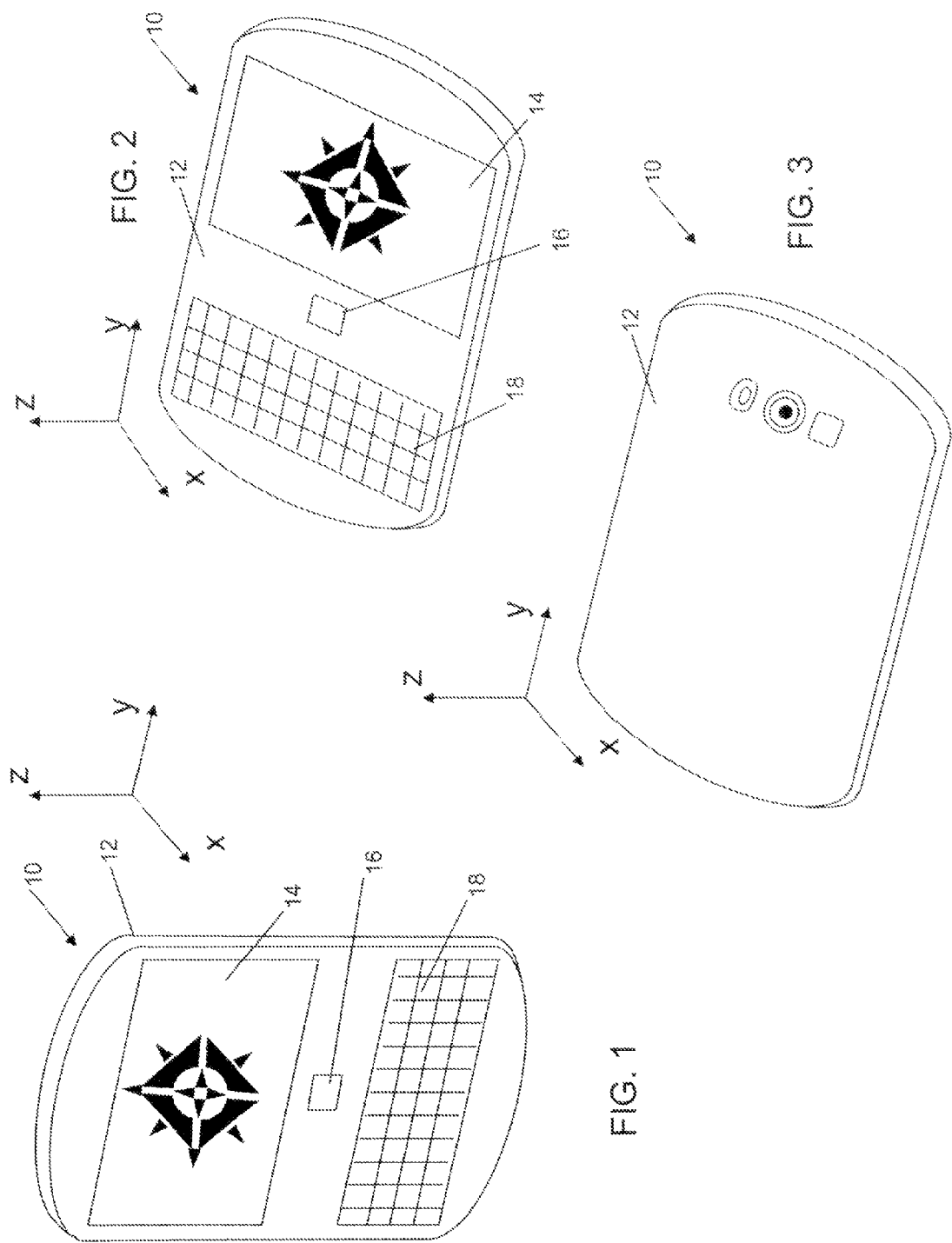

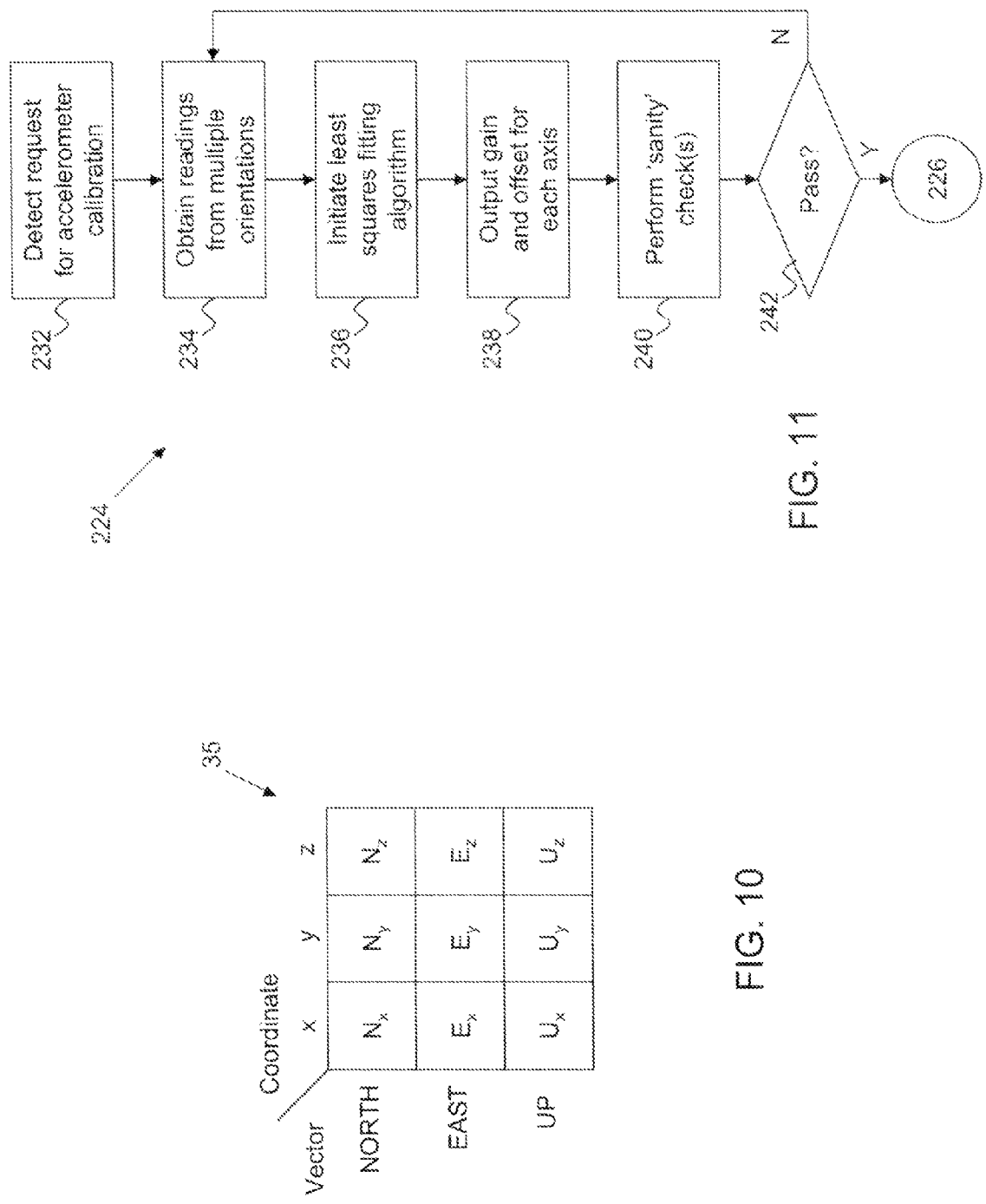

SYSTEM AND METHOD FOR CALIBRATING AN ACCELEROMETER

TECHNICAL FIELD

The following relates to systems and methods for calibrating an accelerometer.

BACKGROUND

An accelerometer is an instrument that measures the proper acceleration of the instrument, i.e. the type of acceleration associated with the phenomenon of weight experienced by a test mass residing in the frame of reference of the accelerometer and thus measures weight per unit of mass, a quantity also known as specific force or "g-force". A multi-axis accelerometer is able to detect magnitude and direction of the proper acceleration as a vector quantity, and can be used to sense orientation (due to changes in direction of weight), coordinate acceleration, vibration, shock, and falling. Accelerometers are often used in portable or handheld or otherwise mobile devices such as cellular telephones, PDAs, smart phones, portable gaming devices, laptop computers, tablet computers; for orientation detection, motion inputs (e.g. for gaming), image stabilization (e.g. when taking photos), drop detection, etc.

The measurements taken by an accelerometer may be used by various applications or other components of the device in which it resides and thus the accuracy of the accelerometer can be important to the operation of the device.

BRIEF DESCRIPTION OF THE DRAWINGS

Embodiments will now be described by way of example only with reference to the appended drawings wherein:

FIG. 1 is a perspective view of an example mobile device displaying an electronic compass.

FIG. 2 is a perspective view of an example mobile device while at rest facing upwardly.

FIG. 3 is a perspective view of an example mobile device while at rest facing downwardly.

FIG. 10 is a pictorial illustration of an orientation matrix.

FIG. 11 is a flow chart comprising an example set of computer executable instructions for performing an accelerometer calibration.

DETAILED DESCRIPTION OF THE DRAWINGS

Figure 5:
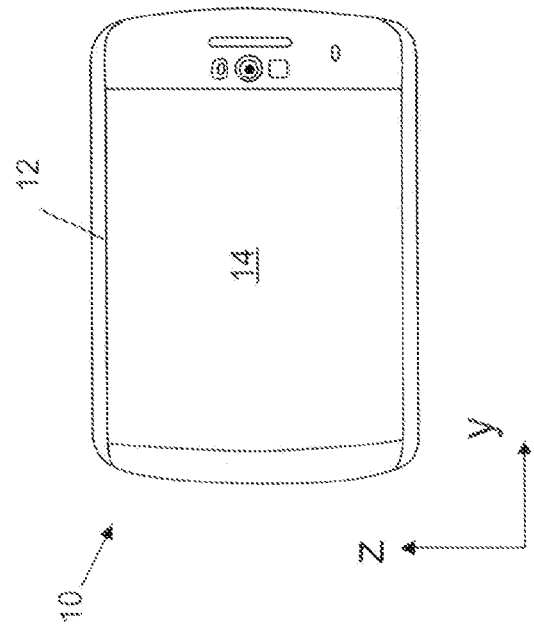
FIG. 5 is a plan view of an example mobile device positioned in a landscape orientation.

Devices that include an accelerometer may also include a magnetometer for providing a digital compass application for showing direction on a display. A magnetometer is an instrument used to measure the strength and/or direction of the magnetic field in the vicinity of the instrument. Many electronic devices exist that utilize a magnetometer for taking measurements for a particular application, e.g. metal detectors, geophysical instruments, aerospace equipment, and mobile devices such as those mentioned above, etc., to name a few.

The digital compass may rely on the accelerometer's measurements in order to electronically "level" the magnetic measurement in order to calculate the device's direction, heading, etc. It has been found that in order for the electronic levelling to perform accurately, the accelerometer should also be measuring accurately. Although an accelerometer may be calibrated at the time of manufacture or assembly, the gains and offsets of each accelerometer have been found to drift with time and according to temperature, wherein temperature can have a significant effect on the drift. In order to attain accuracy of the accelerometer, an accurate gain and an accurate offset for each axis should be maintained over time. In other words, an accelerometer may require periodic calibrating in order to achieve adequate accuracy, in particular when its measurements are being relied on by other components such as the magnetometer.

It has been recognized that to improve the measurements obtained by an accelerometer, shifts in the gains and offsets can be tracked over time. By utilizing magnetometer samples, multiple different steady state orientations of the accelerometer can be detected in order to filter out accelerometer samples that are as a result of movements of the accelerometer. In this way, drifting of the gains and biases can be determined more efficiently. It has also been recognized that the quality of the magnetometer samples can be checked to ensure that the magnetometer data being relied upon, to detect the steady state orientations, are accurate. This allows the accelerometer to be calibrated using only samples that are able to accurately indicate if any drifting has occurred.

Although the following examples are presented in the context of mobile communication devices, the principles may equally be applied to other devices such as applications running on personal computers, embedded computing devices, other electronic devices, and the like.

For clarity in the discussion below, mobile communication devices are commonly referred to as "mobile devices" for brevity. Examples of applicable mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities.

An exterior view of an example mobile device 10 is shown in FIG. 1 The mobile device 10 in this example comprises a housing 12 which supports a display 14, a positioning device 16 (e.g. track pad, track wheel, etc.), and a keyboard 18. The keyboard 18 may comprise a full-Qwerty (as shown) set of keys but may also provide a reduced Qwerty set of keys (not shown) in other embodiments. An x-y-z frame of reference is shown in FIG. 1 to illustrate that the mobile device 10 shown is substantially upright. For example, the mobile device 10 may be positioned upright when stowed in a cradle or holster. A holster, when used, can stow and protect the outer surfaces of the housing 12, display 14, positioning device 16, keyboard 18, etc. and may be used to trigger other features such as a notification profile, backlight, phone, etc. The holster may also include a clip to facilitate supporting the holster and thus the mobile device 10 on a belt or other object.

FIG. 2 illustrates the same frame of reference with the mobile device 10 being shown in a "face-up" position relative to a surface on which it is resting (not shown). FIG. 3 also illustrates the same frame of reference with the mobile device 10 being shown in a "face-down" position relative to a surface on which it rests (not shown). It can therefore be appreciated that the mobile device 10 not only has an absolute position or orientation but also various relative positions or orientations with respect to its own frame of reference and that of other objects.

Figure 4:
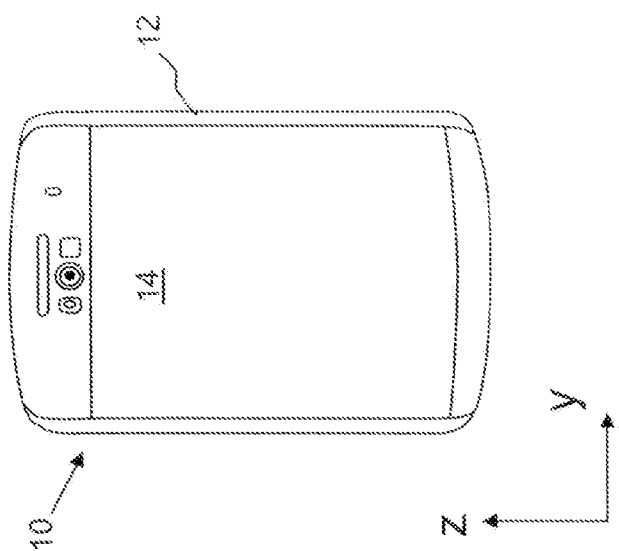
FIG. 4 is a plan view of an example mobile device positioned in a portrait orientation.

FIGS. 4 and 5 illustrate another example mobile device 10 with respect to a two-dimensional frame of reference (y-z in this example). In FIG. 4, a relatively longer dimension of the display 14 is aligned along the z-axis to present the display 14 in a "portrait" orientation. In FIG. 5, the relatively longer dimension is aligned along the y-axis to present the display 14 in a "landscape" orientation. Devices such as an accelerometer 28 (see also FIG. 6) can be used to detect changes in orientation of the mobile device 10 such as a change from the orientation shown in FIG. 4 to that shown in FIG. 5 (or vice versa) and instruct the display to correspondingly rotate the user interface being displayed.

It can be appreciated that the mobile devices 10 shown in FIGS. 1 to 5 are provided as examples for illustrative purposes only and various features thereof have been omitted for brevity. For example, the mobile device 10 shown in FIGS. 4 and 5 may comprise a touch screen display 14 and a "slide-out" keyboard (not shown). In operation, the touch screen display 14 can be used to interact with applications on the mobile device 10 and the keyboard may be slid out from behind the touch screen display 14 when desired, e.g. for typing or composing an email, editing a document, etc. Other example embodiments include mobile devices 10 wherein the housing 12 provides a foldable or flippable, clamshell type mechanism to fold the display 14 towards the keyboard 18 to effectively transition the mobile device 10 between an operable or open state and a standby or closed state.

Figure 6:
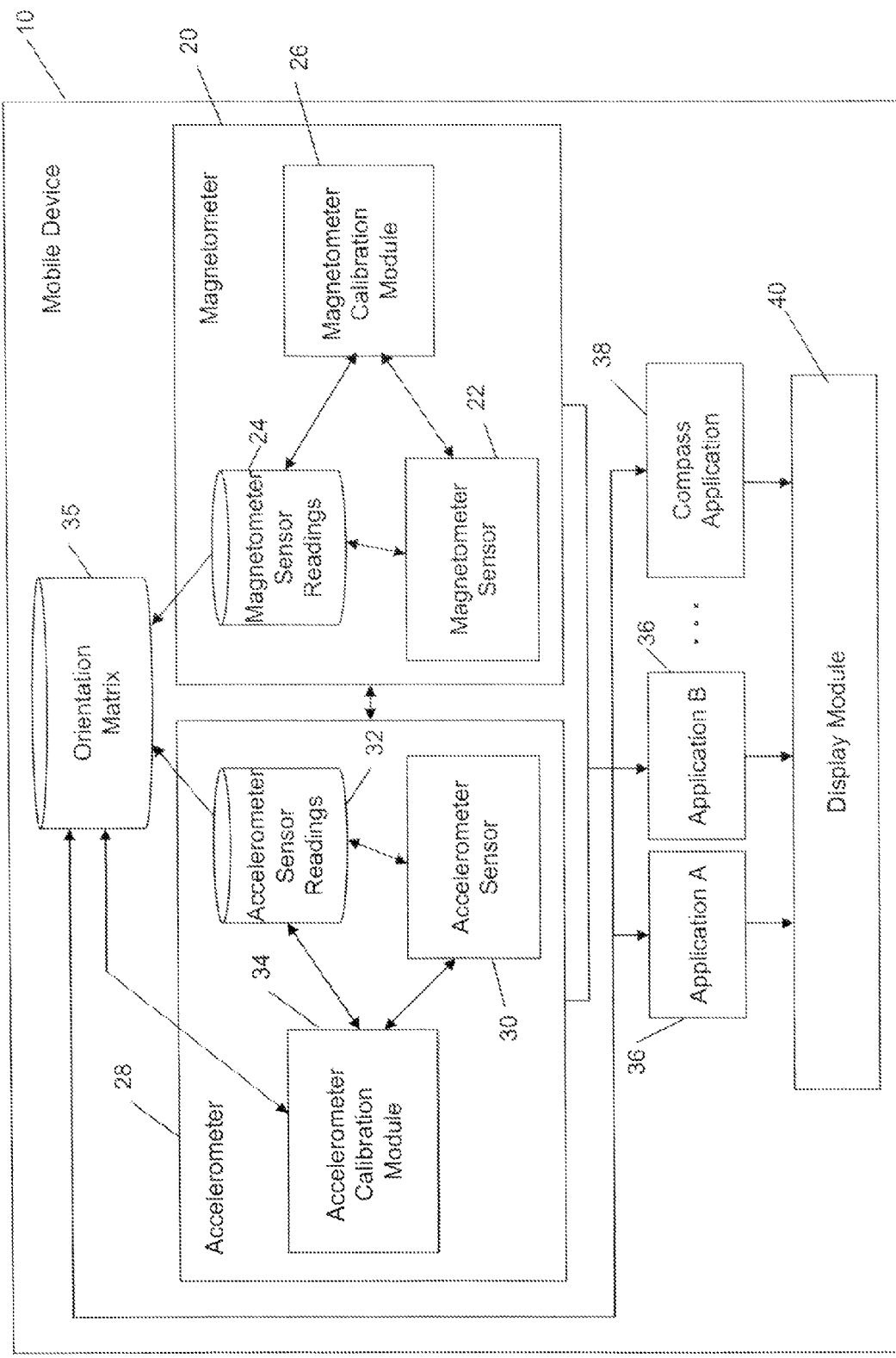
FIG. 6 is a block diagram of an example configuration for a mobile device comprising a magnetometer calibration module.

An example configuration for a mobile device 10 comprising an accelerometer 28 and a magnetometer 20 is shown in FIG. 6. The accelerometer 28, when operable, obtains or otherwise acquires readings including the direction of the proper acceleration of the mobile device 10 and its magnitude, using an accelerometer sensor 30. Such readings are stored in an accelerometer sensor readings data store 32. The accelerometer 28 in this example also includes an accelerometer calibration module 34 for calibrating the accelerometer sensor 30 to compensate for gain and offset drifts to improve the accuracy of the accelerometer readings. Various applications 36 may utilize the readings in the data store 32, e.g. text-based communication applications, gaming applications, etc. The applications 36 may then use such readings to provide and/or update a user interface (UI) using a display module 40.

The magnetometer 20, when operable, obtains or otherwise acquires readings including the direction of the magnetic field and its strength using a magnetometer sensor 22. Such readings are stored in a magnetometer sensor readings data store 24. Various ones of the applications 36 may also utilize the readings in the data store 24. In this example, a compass application 38 is shown specifically. It can be appreciated that the other applications 36 may include any application that can make use of magnetometer readings, for example, a stud finder application, metal detector application, augmented reality based application, etc. The applications 36, 38 may then use such readings to provide and/or update a UI using a display module 40, e.g. a real-time compass showing the mobile device's heading as shown in FIGS. 1 and 2.

The mobile device 10 in this example also includes an orientation matrix 35, which comprises a set of vectors used to determine the orientation of the mobile device 10 and changes in such orientation as will be explained in greater detail below. The vectors in the orientation matrix 35 in this example are computed based on data obtained from both the magnetometer 20 and the accelerometer 28 to thereby provide representations of the orientation of the mobile device 10 that can be indicative of steady state conditions in both the accelerometer's readings and the magnetometer's readings. The accelerometer calibration module 34 can utilize the orientation matrix 35 to conveniently determine such steady state conditions from a single set of data. The applications 36, 38 can also utilize the values from the orientation matrix 35 to estimate the mobile device's orientation, changes in orientation, etc. As shown in FIG. 6, the accelerometer 28 and magnetometer 20 may be operable to communicate with each other, e.g. in order for the accelerometer calibration module 34 to cross-reference the quality of the magnetometer readings as will also be explained in greater detail below. It can be appreciated that various components of the mobile device 10 are omitted from FIG. 6 for ease of illustration.

Figure 7:
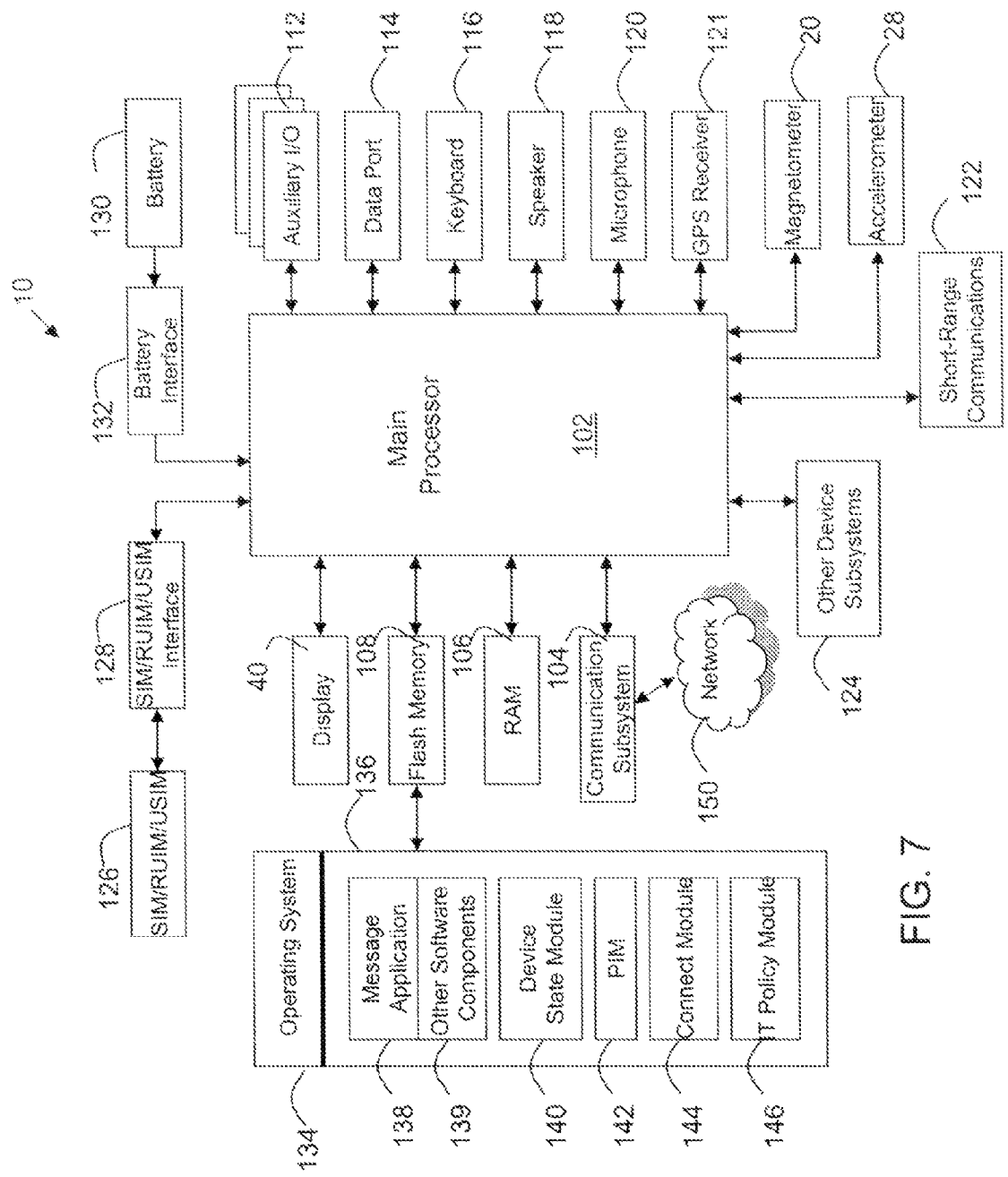
FIG. 7 is a block diagram of an example configuration for a mobile device.

Referring now to FIG. 7, shown therein is a block diagram of an example embodiment of a mobile device 10, which provides further detail thereof. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 150. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 150 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 40, an auxiliary input/output (I/O) subsystem 112, a data port 114, a keyboard 116, a speaker 118, a microphone 120, GPS receiver 121, magnetometer 20, accelerometer 28, short-range communications 122, and other device subsystems 124.

Some of the subsystems of the mobile device 10 perform communication-related functions, whereas other subsystems may provide "resident" or on-device functions. By way of example, the display 40 and the keyboard 116 may be used for both communication-related functions, such as entering a text message for transmission over the network 150, and device-resident functions such as a calculator or task list.

The mobile device 10 can send and receive communication signals over the wireless network 150 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 150. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and may include a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system (OS) 134 and software components 136 to 146. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 150. PIM data items may be seamlessly integrated, synchronized, and updated via the wireless network 150 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 150, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 150. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 40 or alternatively to the auxiliary I/O subsystem 112. A subscriber may also compose data items, such as e-mail messages, for example, using the keyboard 116 in conjunction with the display 40 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 150 through the communication subsystem 104.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 40 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 (or other computing or communication device that utilizes similar principles) or accessible or connectable thereto. Any application or module herein described may be implemented using computer readable/executable instructions that may be stored or otherwise held by such computer readable media.

Figure 8:
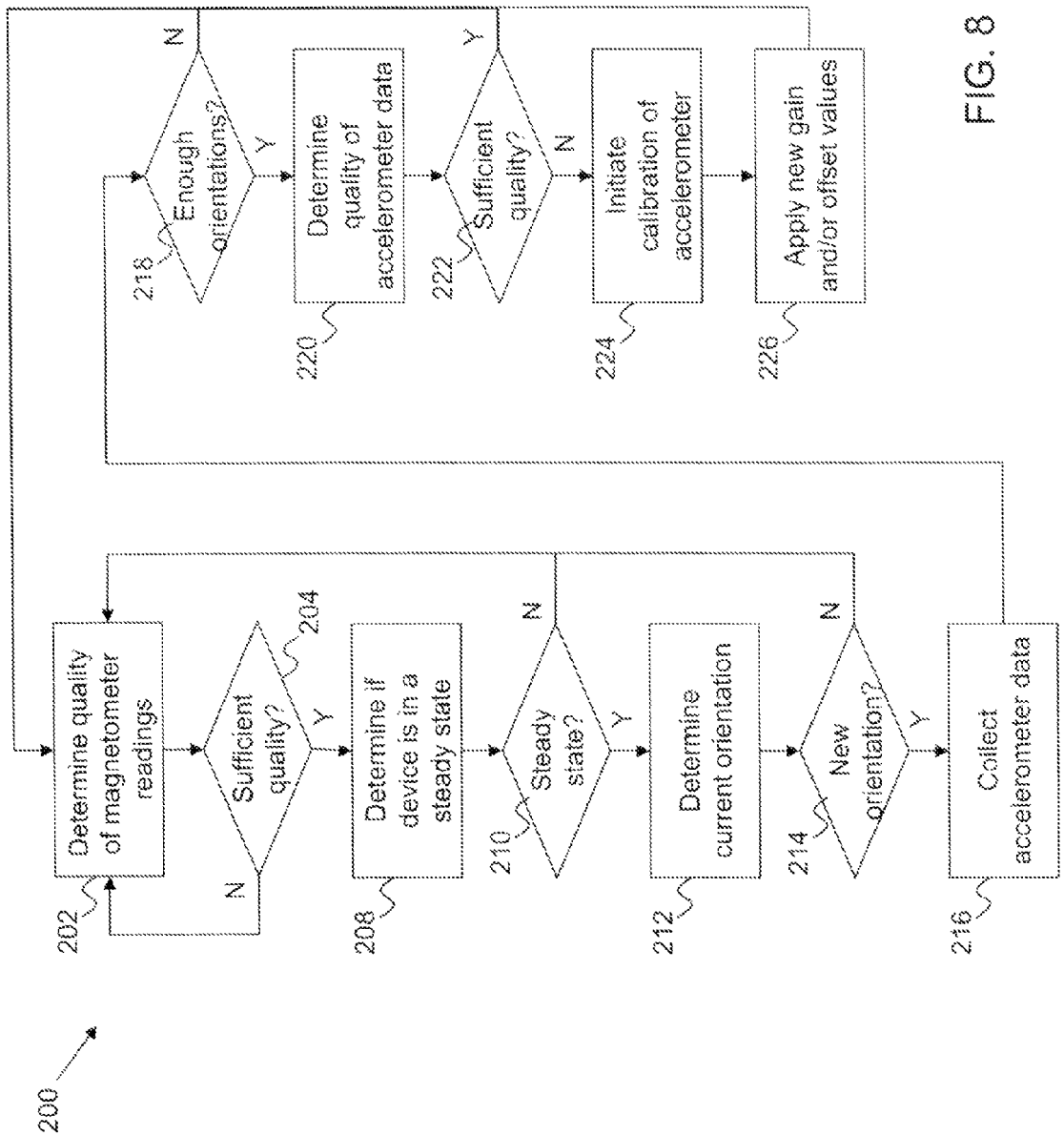
FIG. 8 is a flow chart comprising an example set of computer executable instructions for obtaining accelerometer readings for calibrating an accelerometer on a mobile device.

FIG. 8 illustrates an example set of computer executable operations 200 that may be executed by the accelerometer calibration module 34 to obtain accelerometer data in multiple steady state orientations in order to calibrate the accelerometer sensor 30 and thus improve the accuracy of the accelerometer readings. It can be appreciated that the set of operations 200 may be initiated according to various internal or external events. For example, the set of operations 200 may be triggered periodically, according to an application or OS request to improve quality/accuracy, a user input to improve quality/accuracy, etc.

At 202, the accelerometer calibration module 34 determines the quality of current magnetometer readings 24 in order to determine, at 204, whether or not the magnetometer readings 24 are of sufficient quality. It can be appreciated that the accelerometer calibration module 34 can determine such quality by accessing the magnetometer sensor readings 24, by requesting such data from the magnetometer 20, or using any other available channel to make this determination. As noted above, since the magnetometer readings 24 are at least in part used to detect changes in orientation of the mobile device 10, the magnetometer readings 24 should be as accurate as possible in order to ensure that they can be relied upon. Moreover, since the orientation matrix 35 combines both magnetometer and accelerometer sensor readings 24, 32, accuracy of the magnetometer 20 improves confidence in the detection of a steady state condition. If the magnetometer readings 24 are not of sufficient quality, the accelerometer calibration module 34 can return to checking quality at 202 (e.g. at a later time) as shown, end the process until a new request to perform an accelerometer calibration is detected (not shown), or may proceed to inform the magnetometer 20 of the poor quality (also not shown). Since the magnetometer calibration module 26 will typically operate independently of the accelerometer calibration module 34, the magnetometer calibration module 26 may have already detected such poor quality and be in the process of calibrating the magnetometer 20, details of which are provided later.

Quality measures are determined for magnetometer readings 24 as they are collected and are then associated with the corresponding data stored in the magnetometer sensor readings data store 24 to enable the magnetometer 24 to provide an indication of quality at the same time that it provides the magnetometer sensor reading itself. By applying quality indicators, the magnetometer calibration module 26 can detect whether or not a current magnetometer calibration (i.e. due to the last calibration performed on the magnetometer sensor 22) is of good or poor quality. By making such quality indicators available to the accelerometer calibration module 34, the accelerometer calibration module 34 can use the quality of the magnetometer readings 24 as an initial check to determine if it is appropriate to begin collecting accelerometer readings 32 and ultimately performing a calibration of the accelerometer sensor 30.

Figure 9:
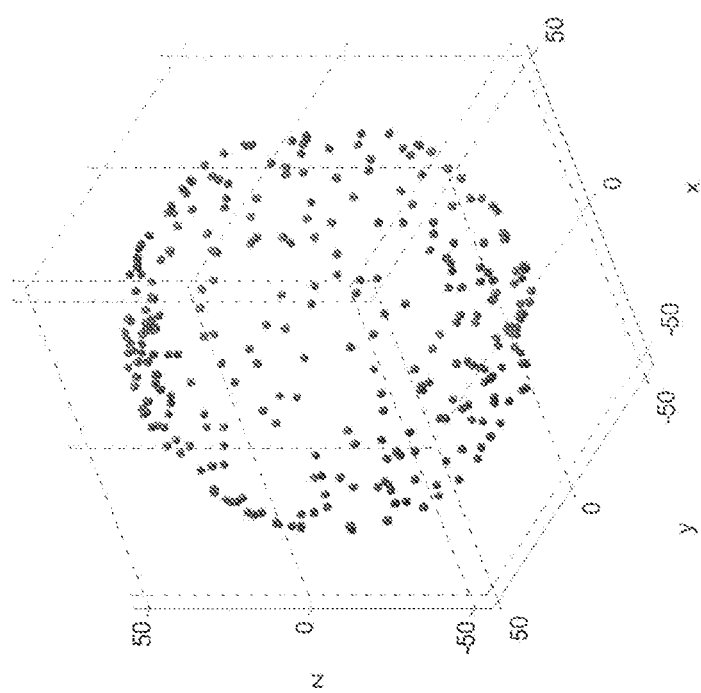
FIG. 9 is a data point graph illustrating magnetometer readings of sufficient quality.

The quality indicators used for calibrating a three-axis magnetometer sensor 22 can be used separately by the magnetometer 20 to, in part, determine when to calibrate the magnetometer sensor 22. The magnetometer sensor 22 may be calibrated in various ways, including those calibration methods described later, for inaccuracies in gain (which can be different for each axis), DC offset (which can also be different for each axis), and inter-axis misalignment angles. DC offset refers to the steady state bias (i.e. offset) of sensor axes (e.g. 3 values, 1 per sensor axis for a 3-axis magnetometer). The DC offset is the sensor axes' measurement point of intersection origin, and it is usually is non-zero, as it typically has a bias due to the net effect of the Hard Iron inside the mobile device 10. As such, a calibration of the magnetometer sensor 22 can be performed to improve the accuracy of three calibration parameters, which may apply to each axis. Application of the calibration parameters enables the readings 24 to lie on a sphere as shown in FIG. 9. As discussed below, in some modes of operation, not all calibration parameters may be used. For example, a mobile device 10 may be operated with a gain +DC offset calibration only, or with a DC offset only calibration.

Referring again to FIG. 8, if the accelerometer calibration module 34 determines at 204 that the magnetometer readings 24 are of a sufficient quality, it can determine, at 208, if the mobile device 10 is in a steady state. In this example embodiment, the accelerometer calibration module 34 references the orientation matrix 35 to determine if particular ones of the vectors therein remain steady (i.e. do not change more than a predetermined noise factor associated with the magnetometer readings 34, e.g. as given by the manufacturer/vendor) thus indicating that the mobile device 10 and thus the magnetometer 20 and accelerometer 28 are in a steady state. In such a state, the measured magnetic field strength and direction should be substantially constant while the mobile device 10 holds its particular orientation (e.g. one of those shown in FIGS. 1 to 5). Similarly, the proper acceleration measured by the accelerometer should also be substantially constant. For example, in a steady state, the reading in the z-direction should be substantially 1 g upwards because any point on the Earth's surface is accelerating upwards relative to the local inertial frame, and the other coordinates should be substantially constant.

FIG. 10 illustrates an illustration of an example orientation matrix 35. In this example, the orientation matrix 35 includes three vectors, referred to as "UP", "NORTH", and "EAST", each have respective x, y, and z coordinates. The UP vector ($U_x$, $U_y$, $U_z$) corresponds to the accelerometer vector and, at rest, if the accelerometer sensor 30 is calibrated properly, should only provide a reading in the $U_z$ coordinate when planar to the Earth's surface or otherwise provide substantially constant values for each coordinate to indicate a steady state condition. The NORTH and EAST vectors are used to provide a combined representation of both magnetometer data and accelerometer data at the same time, in order to indicate, from one value, whether or not both the magnetometer and accelerometer are showing a steady state condition. In this example, the NORTH and EAST vectors are derived from cross products of the accelerometer and magnetometer vectors. The resultant vectors correspond to vectors which are perpendicular to both of the input vectors being multiplied and normal to the plane containing them. In this example, the EAST vector is obtained by taking the cross product of the magnetometer vector by the accelerometer vector (mag×accel) and the NORTH vector is obtained by taking the cross product of the accelerometer vector by the EAST vector (accel×EAST). In a steady state condition, both the EAST and NORTH vectors are not changing thus indicating that neither the magnetometer sensor readings 24 nor the accelerometer sensor readings 32 are changing. It can be appreciated that the magnetometer sensor readings 24 and the accelerometer sensor readings 32 could also be checked separately in order to determine that both types of readings are steady.

If at 210 the accelerometer calibration module 34 determines that the mobile device 10 is not currently in a steady state, it may return to checking the quality of the magnetometer readings and check again for a steady state condition. If at 210 the accelerometer calibration module 34 determines that the mobile device 10 is currently in a steady state, the current orientation of the mobile device 10 is determined at 212, e.g. by referencing the UP vector in the orientation matrix 35. The accelerometer calibration module 34 may then determine at 214 if the current orientation is a "new" orientation with respect to the accelerometer samples 32 being collected for the accelerometer calibration (with the first recorded orientation always producing a "Y" at 214). If the detected orientation is not new, the accelerometer calibration module 34 may repeat the method in order to subsequently detect a new orientation at 214. If the detection orientation is new, the accelerometer calibration module 34 begins to collect accelerometer readings 32 at 216. The number of accelerator samples required at each new and different orientation varies based on the parameters, capabilities, and performance of the accelerometer sensor 30. For example, to sufficiently account for noise in the accelerometer readings 32 (in other words average out the accelerometer measurement noise), typically a double digit number of samples is required. The value can change depending on the sampling rate of the accelerometer sensor 30—the higher the sampling rate the higher the noise thus requiring more readings 32. The accelerometer readings 32 should be within the noise variance of the accelerometer sensor 30.

Once enough accelerometer readings are obtained at the current steady state orientation, the accelerometer calibration module 34 then determines at 218 if accelerometer readings 32 have been obtained at enough different steady state orientations. The number of different orientations to be measured depends on the technique used to calculate the gains and offsets. In this example embodiment, a least square error estimation algorithm is used and a 3-axis accelerometer would require three different orientations to be measured. If at 218 it is determined that fewer than three different orientations have been measured, the method is repeated until three different orientations are measured. Once enough different orientations have been measured, the accelerometer calibration module 34 determines at 220 if the accelerometer readings 32 being relied on are of sufficient quality. Such a check can be made as a decision point to determine whether or not to initiate an accelerometer calibration. Since it has been found that the accelerometer 28 does not typically require calibration as much as, for example, the magnetometer 20, various steps and the requisite processing power and battery drain can be avoided by having a good set of accelerometer samples and checking them for sufficient quality. In one, to check the quality of the accelerometer readings 32, the accelerometer calibration module 34 can check whether or not the vectors lie within an ideal sphere with a radius of 1 g and centred at zero (e.g. similar to that shown in FIG. 9 but for a sphere corresponding to the values in the accelerometer vectors). If the accelerometer readings 32 pass such a test and it is determined at 222 that the current quality is sufficient, the accelerometer calibration module 34 may repeat the method.

If the accelerometer samples 32 collected at 216 for each orientation do not lie within the ideal sphere or otherwise are not of sufficient quality, a calibration of the accelerometer, using the collected samples, is initiated by the accelerometer calibration module 34 at 224. The result of the calibration algorithm will be gain and offset values for each of the accelerometer sensor's axes and such values are applied at 226 to subsequent accelerometer readings 32. The method shown in FIG. 8 may then be repeated in order to continue collecting accelerometer readings 32 at different orientations and thus detect drifting of the gains and offsets if such drifting occurs.

As noted above, in this example embodiment, a least squares error estimation algorithm is be used to determine the gains and offsets for calibrating the accelerometer sensor 30. The output of the accelerometer calibration at 224 provides a gain vector including three coordinates, one for each axis. Similarly, an offset vector is provided which includes three coordinates, one for each axis. FIG. 11 illustrates an example set of computer executable operations for performing 224 in FIG. 8. At 232, the accelerometer calibration module 34 detects a request for an accelerometer calibration. The accelerometer readings 32 from the three or more different orientations are obtained at 234, and a least squares fitting algorithm is initiated at 236. The least squares fitting algorithm is used to find the best fit of the raw data to the model being used.

Since the gains and offsets can be represented using 3×1 vectors, the following equation may be used to determine the 3 gains and the 3 offsets:

$a(x+b)^2 + c(y+d)^2 + e(z+f)^2 = 9.8$ m/s$^2$; where a, c, and e are the gain vector's coordinates, and b, d, and f are the offset vector's coordinates.

The output of the least squares fitting algorithm is then obtained at 238 and includes the values GAIN=(a, c, e), and OFFSET (b, d, f). It can be appreciated that if only OFFSETS are being calibrated, values a, c, and e in the above equation would be set to equal zero.

The outputs may then be "sanity" checked at 240 to discard obviously erroneous results. For example, the minimum and maximum possible offsets for the accelerometer sensor 30 may be known and thus results that are outside of this range can be deleted. Also, based on, for example, the mobile device's ADC (analog-to-digital conversion) range, upper and lower bounds of possible ranges of gains and offsets can be performed to also eliminate likely erroneous results. Once the gains and offsets are found to pass the sanity checks at 242, they can be applied at 226 to correct the raw sensor readings, by subtracting the estimated offset and adjusting the gain for each axis. It can be appreciated that, as noted above, some accelerometers 28 may only require offsets to be calibrated rather than both gains and offsets. As such, the accelerometer calibration performed at 224 provides a set of calibration parameters that may include offset values (e.g. offset vector), gain values (e.g. gain vector), or both gain and offset values.

As discussed above, if the magnetometer sensor readings 24 are not of sufficient quality, the magnetometer calibration module 26 may separately, or according to an input from the accelerometer calibration module 34, perform a calibration. The calibration performed on the magnetometer sensor 22 can involve a background calibration or a foreground calibration. The following examples illustrate example methods for performing foreground and background calibrations on a magnetometer sensor 22.

Figure 12:
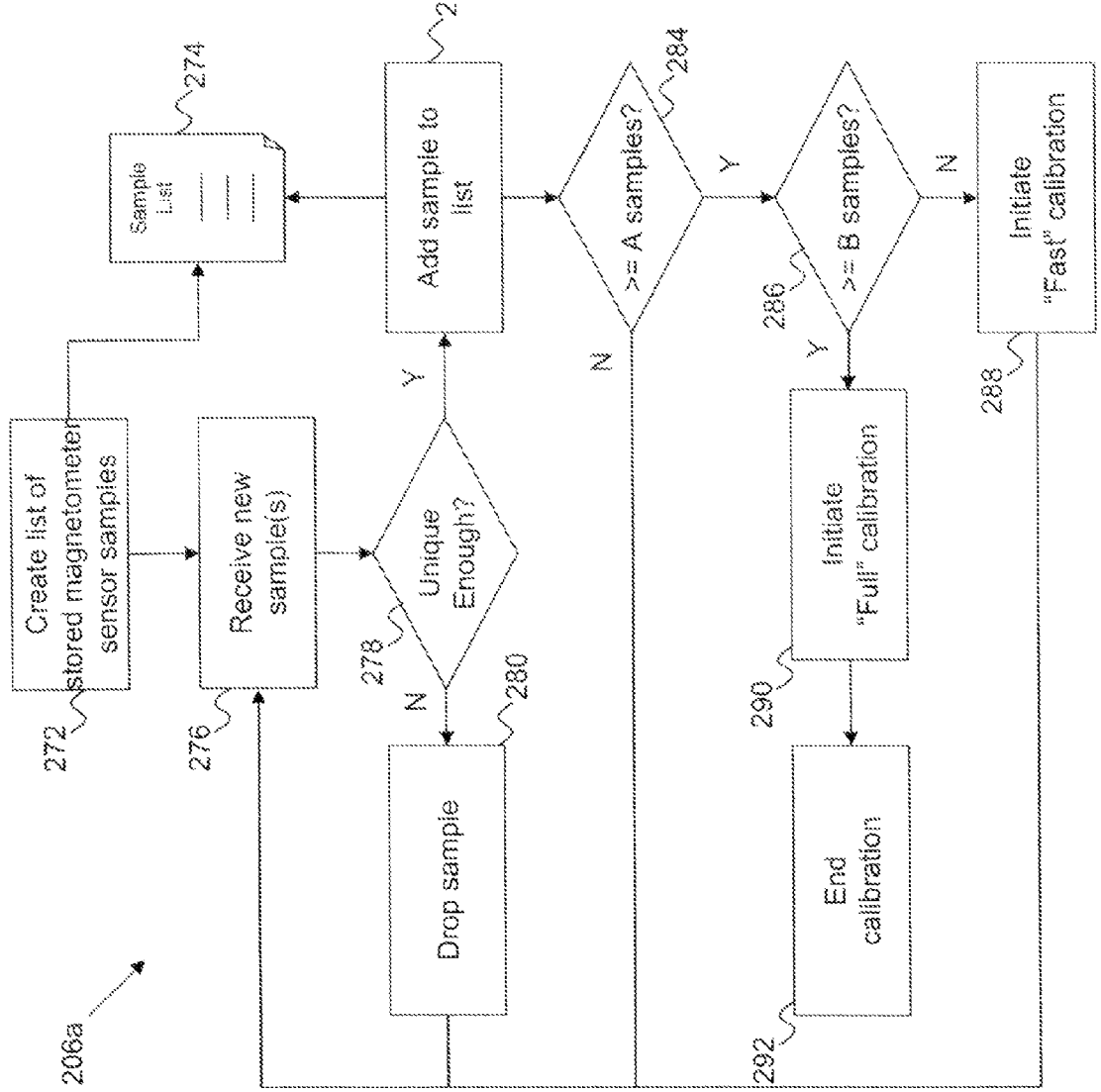
FIG. 12 is a flow chart comprising an example set of computer executable instructions for performing a foreground magnetometer calibration method.

An example set of computer executable instructions for performing a foreground calibration 206a is shown in FIG. 12. In this example, the foreground calibration 206a has three states, namely: UNCALIBRATED, UNCALIBRATED_DCO, and CALIBRATED. At 272, a list 274 of stored magnetometer sensor samples is created. Initially, the list 274 is empty and the foreground calibration 206a enters the UNCALIBRATED state. The magnetometer calibration module 26 then receives one or more new samples at 276. As these new samples arrive, they are compared at 278 with those samples already stored in the list 274 to determine if the new samples are unique enough. Any new sample which is deemed to be too similar to any of the previously stored samples is thus dropped at 280. There are various ways to determine whether or not the received sample is "too close" or "not unique enough". For example, a simple way is to drop samples which are identical to one or more previously stored samples. To provide improved performance, other metrics can be used such as the minimum Euclidean distance between the new sample and every previously-stored sample. If the minimum Euclidean distance is above a threshold, the newly arrived sample may be deemed "sufficiently different or unique" and added to the list 274 at 282.

The magnetometer calibration module 26 then determines at 284 and 286 if enough samples have been accumulated in order to initiate the fast calibration at 288. As will be explained in greater detail below, the fast calibration can be used to correct DC offset only, which is faster than performing a calibration of all three parameters and can be used to assist in increasing the number of samples in the list 274. In FIG. 12 it can be seen that between A and B samples are required to initiate the fast calibration at 288. The number of samples represented by A and B may be chosen according to the techniques used in the fast and full calibrations. For example, as explained below, the fast and full calibrations in the examples provided herein require at least 3 data points to perform a least squares fitting method for DC offset only (i.e. A>=3), and require at least 9 data points to perform a least squares fitting method for all three parameters (i.e. B>=9). A and B can be set as the minimum requirements or can be higher if desired. However, as will be shown, by requiring 4 values, the first, second and third values can be used to compute a DC offset for the first, second and third axes and the fourth value can be used to determine the radius of the sphere.

In the present example, once the number of readings in the list 274 is greater than or equal to 4, but not yet greater than or equal to 9, the fast calibration is initiated at 288. The fast calibration may be repeated in order to more quickly increase the number of readings in the list 274 in order to initiate the full calibration at 290. Once the fast calibration is successful, the foreground calibration 206a enters the UNCALIBRATED_DCO state. If the foreground calibration 206a is in the UNCALIBRATED or UNCALIBRATED_DCO states, once 9 or more readings are in the list 274, the full calibration is initiated at 290 in order to correct all three calibration parameters. Once the full calibration succeeds, the foreground calibration 206a enters the CALIBRATED state and the calibration ends at 292.

It may be noted that in this example, if the foreground calibration 206a is in the UNCALIBRATED_DCO or CALIBRATED states, the calibration corrections may be applied to the raw input sensor data in order to obtain the calibrated output data. With the foreground calibration 206a complete, as was discussed above, the ongoing calibration 204 takes over, e.g. to perform background calibration 206b when appropriate.

It can be appreciated that separating the foreground calibration 206a into two stages, one comprising a fast calibration and the other comprising a full calibration, several desirable advantages are realized. The fast calibration initially provides coarse heading information with very little device movement required. As the user continues to move the mobile device 10, the fast calibration is able continually refine the calibration. Once the user has moved the mobile device 10 through more movements, a full and more accurate calibration is performed to compensate for all three parameters. In other words, as the user begins moving the mobile device 10, the magnetometer calibration module 26 can quickly begin calibrating the magnetometer 24, even if the user has not made significant movements yet.

The background calibration 206b may be performed on an ongoing basis when the magnetometer calibration module 26 detects that the quality of the magnetometer readings are not of sufficient quality (e.g. above a particular threshold as shown in FIG. 7). The background calibration 206b is thus used to continually improve the accuracy of the calibration, without requiring user intervention or special gestures or movements. This differs from the foreground calibration 206a discussed above, which is invoked when calibration is requested by an application 30, OS 134, user, etc. However, as will be seen below, the background calibration 206b utilizes many of the same techniques used in the foreground calibration 206a, namely operations 272 through 292 in FIG. 12.

Figure 13:
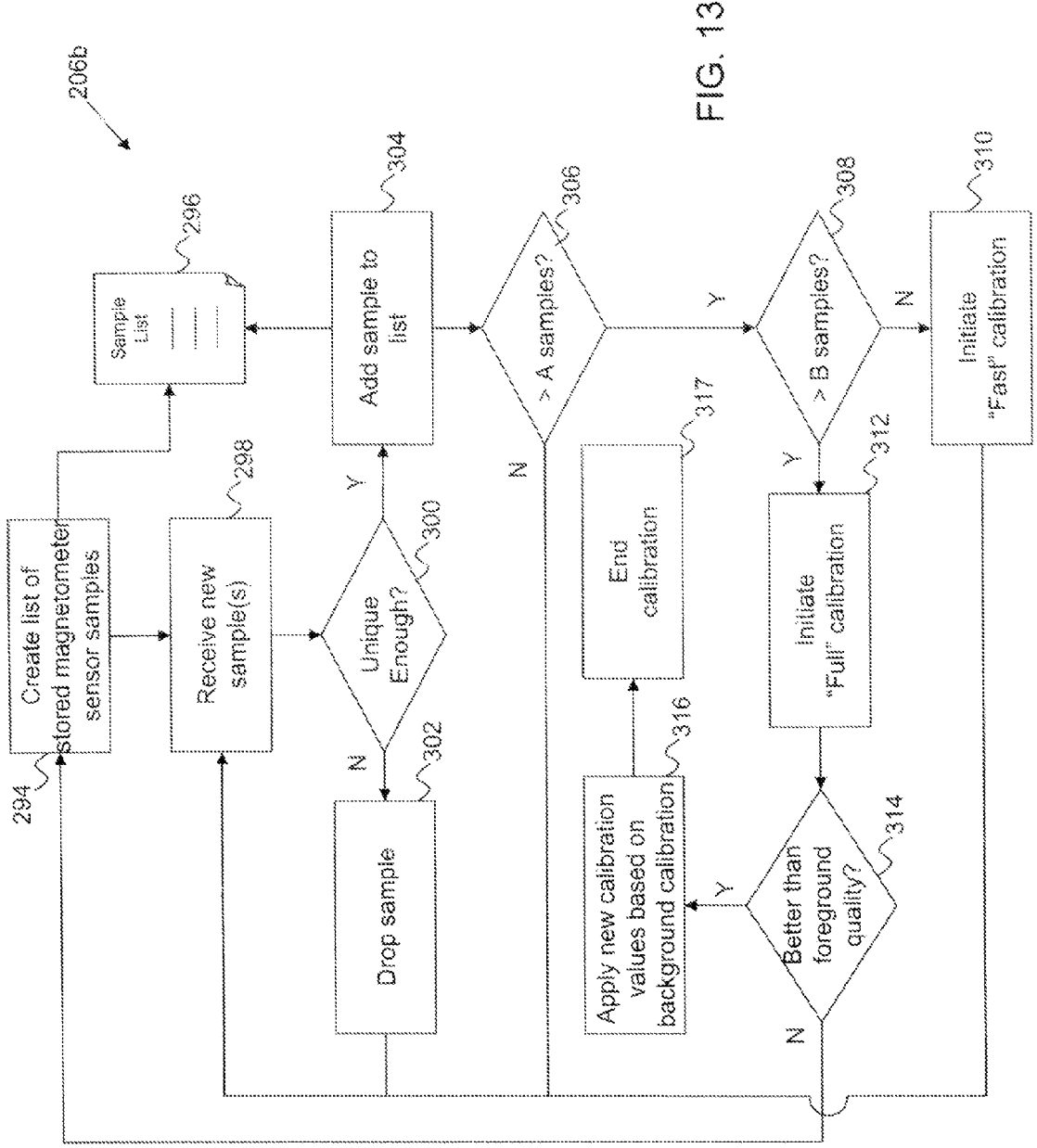
FIG. 13 is a flow chart comprising an example set of computer executable instructions for performing a background magnetometer calibration method.

Turning now to FIG. 13, an example set of computer executable instructions for enabling the magnetometer calibration module 26 to perform a background calibration 206b is shown. In this example, the background calibration 206b has four states, namely: CALIBRATED, CALIBRATED_SEARCHING, CALIBRATED_SEARCHING_DCO, and CALIBRATED_TESTING. Since the background calibration 206b is ongoing, the background calibration 206b is normally in the CALIBRATED state. As noted above, in this state, the calibration quality is continually being checked (at 206—see FIG. 7). The magnetometer calibration module 26 (or a module dedicated to the background calibration 206b) may keep an average of, e.g. 100 quality estimates. If the average quality over that period drops below a pre-defined threshold, the magnetometer calibration module 26 determines that background calibration 206b is required and enters the CALIBRATED_SEARCHING state and the method in FIG. 13 begins.

When in the UNCALIBRATED state, at 294, a list 296 of stored magnetometer sensor samples is created. Initially, the list 296 is empty. The magnetometer calibration module 26 then receives one or more new samples at 298. As these new samples arrive, they are compared at 300 with those samples already stored in the list 296 to determine if the new samples are unique enough. Any new sample which is deemed to be too similar to any of the previously stored samples is thus dropped at 302. There are various ways to determine whether or not the received sample is "too close" or "not unique enough". For example, a simple way is to drop samples which are identical to one or more previously stored samples. To provide improved performance, other metrics can be used such as the minimum Euclidean distance between the new sample and every previously-stored sample. If the minimum Euclidean distance is above a threshold, the newly arrived sample may be deemed "sufficiently different or unique" and added to the list 296 at 304.

The magnetometer calibration module 26 then determines at 306 and 308 if enough samples have been accumulated in order to initiate the fast calibration 212 at 310. As will be explained in greater detail below, the fast calibration can be used to correct DC offset only, which is faster than performing a calibration of all three parameters and can be used to assist in increasing the number of samples in the list 296. In FIG. 13 it can be seen that between A and B samples are required to initiate the fast calibration at 310. The number of samples represented by A and B may be chosen according to the techniques used in the fast and full calibrations. For example, as explained below, the fast and full calibrations in the examples provided herein require at least 3 data points to perform a least squares fitting method for DC offset only (i.e. A>=3)—but may use a fourth data point to determine the radius of the sphere, and require at least 9 data points to perform a least squares fitting method for all three parameters (i.e. B>=9). A and B can be set as the minimum requirements or can be higher if desired.

In the present example, once the number of readings in the list 296 is greater than or equal to 4, but not yet greater than or equal to 9, the fast calibration is initiated at 310 and the background calibration 206b enters the CALIBRATED_SEARCHING_DCO state. The fast calibration may be repeated in order to more quickly increase the number of readings in the list 296 in order to improve the fast calibration. If the background calibration 206b is in the CALIBRATED_SEARCHING or CALIBRATED_SEARCHING_DCO states, once 9 or more readings are in the list 296, the full calibration is initiated at 312 in order to correct all three calibration parameters. Once the full calibration succeeds, the background calibration 206b enters the CALIBRATED_TESTING state.

It may be noted that in all states, stored correction values from previous foreground calibrations 218 may be applied to the raw sensor data. The calibration data (based on foreground calibration parameters) is then checked for quality and the result stored (not shown).

The foreground qualities may then be averaged over, e.g. 100 samples. If the average foreground quality exceeds a predefined threshold, then the background calibration 206b is determined to no longer be needed. In this case, the background calibration 206b returns to the CALIBRATED state without completing. It can be appreciated that since foreground calibrations 218 may be performed separately from the background calibrations 210 if the magnetometer calibration module 26 was already able to achieve sufficient calibration, it can minimize processor load by prematurely ending the background calibration.

It may also be noted that in this example, if the background calibration 206b is in the CALIBRATED_SEARCHING_DCO or CALIBRATED_TESTING states, the background calibration corrections may be applied to the raw input sensor data in order to obtain the calibrated output data. The calibrated measurements may then be checked for quality and the results stored. An average of background qualities may then be obtained, e.g. over 100 measurements. The magnetometer calibration module 26 may then determine at 314 if the background qualities are better than the stored foreground qualities. If not, the background calibration 206b returns to the CALIBRATED_SEARCHING state by returning to 294. If however, the background qualities are better, the background calibration 206b has succeeded and the new calibration parameters are applied based on the background calibration 206b at 316 and the old foreground values are deleted. The background calibration 218 then returns to the CALIBRATED state and calibration ends at 317.

As discussed above, both the foreground calibration 206a and background calibration 206b may utilize a fast calibration to estimate and remove DC offset/bias from a set of readings, in this example of a three-axis magnetometer 20. Removing such an offset is considered important as it is a significant contributor to the overall magnetometer inaccuracy.

Figures 14, 15:
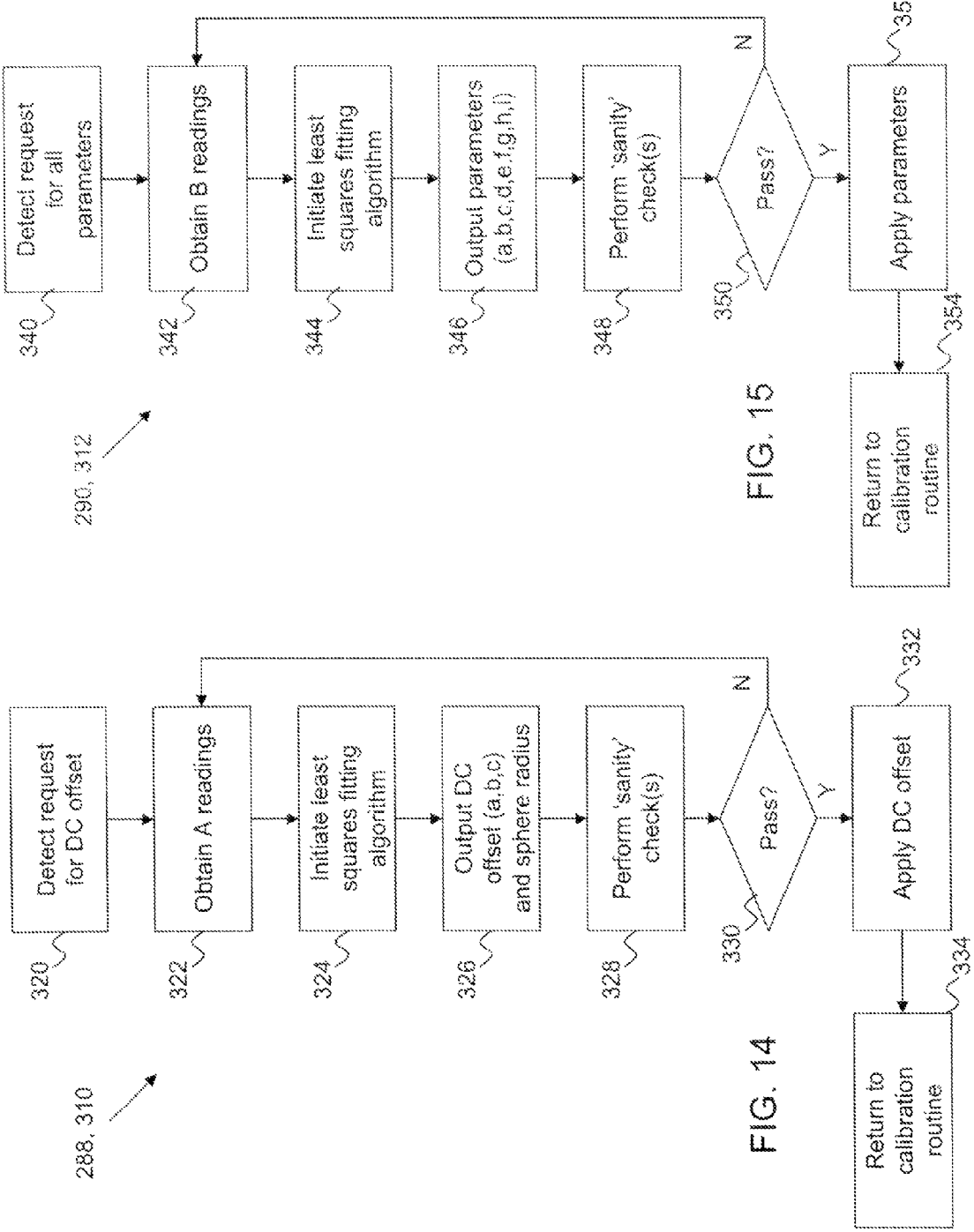
FIG. 14 is a flow chart comprising an example set of computer executable instructions for performing a fast magnetometer calibration.
FIG. 15 is a flow chart comprising an example set of computer executable instructions for performing a full magnetometer calibration.

The fast calibration is initiated when 3 or more sufficiently different or unique readings have been obtained. FIG. 14 illustrates an example set of computer executable instructions for performing the fast calibration. At 320, the magnetometer calibration module 26 detects a request for a DC offset (i.e. the "fast" calibration). The A readings (e.g. 3 or more—in this example 4 to determine radius of sphere) are obtained at 322, and a least squares fitting algorithm is initiated at 324. The least squares fitting algorithm is used to find the best fit of the raw data to the model being used. It has been found that a suitable model assumes that the magnetic field is spherical with radius R and center at (t, u, v), namely: $(X-t)^2+(Y-u)^2+(Z-v)^2=R^2$. The output of the least squares fitting algorithm is then obtained at 326 and includes the values (t, u, v), and the radius R. The outputs may then be "sanity" checked at 328 to discard obviously erroneous results. For example, the minimum and maximum total magnetic strength over the entire earth are known and thus results that have an R value outside of this range can be deleted. Also, based on, for example, the mobile device's ADC (analog-to-digital conversion) range, upper and lower bounds of possible ranges of DC offsets can be performed to also eliminate likely erroneous results. Once a DC offset is found to pass the sanity checks at 330, it can be applied at 332 to correct the raw sensor readings, by subtracting the estimated DC offset for each axis. The magnetometer calibration module 26 may then return to the calibration routine which requested the fast calibration at 334 (i.e. the foreground calibration 206a or background calibration 206b).

The full calibration is used to estimate and remove the effects of not only DC offset/bias, but also gain and inter-axis misalignment errors from a set of readings of a three-axis magnetometer 24. Removing such effects is important in order to maximize the overall accuracy of the magnetometer 24 and the applications 30 utilizing same.

The full calibration is initiated when 9 or more sufficiently different or unique readings have been obtained. FIG. 15 illustrates an example set of computer executable instructions for performing the full calibration. At 340, the magnetometer calibration module 26 detects a request for all three parameters to be corrected (i.e. the "full" calibration). The B readings (e.g. 9 or more) are obtained at 342, and a least squares fitting algorithm is initiated at 344. The least squares fitting algorithm is used to find the best fit of the raw data to the model being used. It has been found that a suitable model assumes that the magnetic field has a center at (a, b, c) namely: $aX^2+bY^2+cZ^2+dXY+eXZ+fYZ+gX+hY+iZ=1$. The output of the least squares fitting algorithm is then obtained at 346 and includes the values (a, b, c, d, e, f, g, h, i), which are converted into gains, offsets and angles through a transformation as will be explained in greater detail below. The outputs may then be "sanity" checked at 348 to discard obviously erroneous results. For example, the quadratic equation above can represent may geometric shapes such as hyperboloids, cones, etc. However, it is understood from the physics of the magnetometer 24 that the correct solution to the model should be an ellipsoid. Thus, an non-ellipsoid solutions can be discarded. Additionally, other sanity checks such as knowledge of the minimum and maximum possible DC offsets, allowable range of gains, etc. can be used to discard other erroneous values. Once a DC offset is found to pass the sanity checks at 350, it can be applied at 352 to correct the raw sensor readings, by applying the calibration parameters to the incoming raw sensor samples in order to compensate for the biases, gains, and misalignment errors. The magnetometer calibration module 26 may then return to the calibration routine which requested the fast calibration at 354 (i.e. the foreground calibration 206a or background calibration 206b).

An example 9-point full calibration and an example 4-point fast calibration using a least square algorithm will now be provided.

For a 9-point "full" calibration, using least-squares, the following equation is solved:

$$aX^2+bY^2+cZ^2+dXY+eXZ+fYZ+gX+hY+iZ=1$$

Solving this equation results in the values for a, b, c, d, e, f, g, h, and i. These values are then converted as follows:

$$q1=\operatorname{sqrt}(a);$$

$$q2=d/(2*q1);$$

$$q3=e/(2*q1);$$

$$q4=g/(2*q1);$$

$$q5=\operatorname{sqrt}(b-q2^2);$$

$$q6=(f/2-q2*q3)/q5;$$

$$q7=(h/2-q2*q4)/q5;$$

$$q8=\operatorname{sqrt}(c-q3^2-q6^2);$$

$$q9=(i/2-q3*q4-q6*q7)/q8;$$

The different q values then form the following matrix:

$$\text{Transform}=\begin{bmatrix} q1 & q2 & q3 & q4 \\ 0 & q5 & q6 & q7 \\ 0 & 0 & q8 & q9 \\ 0 & 0 & 0 & 1 \end{bmatrix}$$

The Transform (T) matrix above is then scaled so that it has the appropriate magnitude. If you have a raw sample point (x,y,z) and you want to use the calibration parameters to correct it, you can do the following:

1) Create the column vector: Input=$[x\ y\ z\ 1]^T$
2) Calculate the Matrix-vector product: Output=Transform*Input
3) Then the Output vector has the corrected x, y and z in entries 1, 2, and 3.

It may be noted that the centers, gains and angles may not need to be calculated in order to apply the compensation method. Instead, only the Transform matrix as described above may be required.

For the 4-point "fast" calibration, using least-squares, the following equation is solved:

$$tX+uY+vZ+w=-(X^2+Y^2+Z^2)$$

From this equation, solutions for parameters t, u, v, and w are obtained. The following transformation matrix Transform can be obtained:

$$Transform = \begin{bmatrix} 1 & 0 & 0 & (t/2) \\ 0 & 1 & 0 & (u/2) \\ 0 & 0 & 1 & (v/2) \\ 0 & 0 & 0 & 1 \end{bmatrix}$$

The estimated radius is given by:
Radius=Sqrt((−t/2)^2+(−u/2) ^2+(−v/2)^2−w), and the estimated DC offset can be obtained by feeding the Transform matrix into the routine below.

Figure 16:
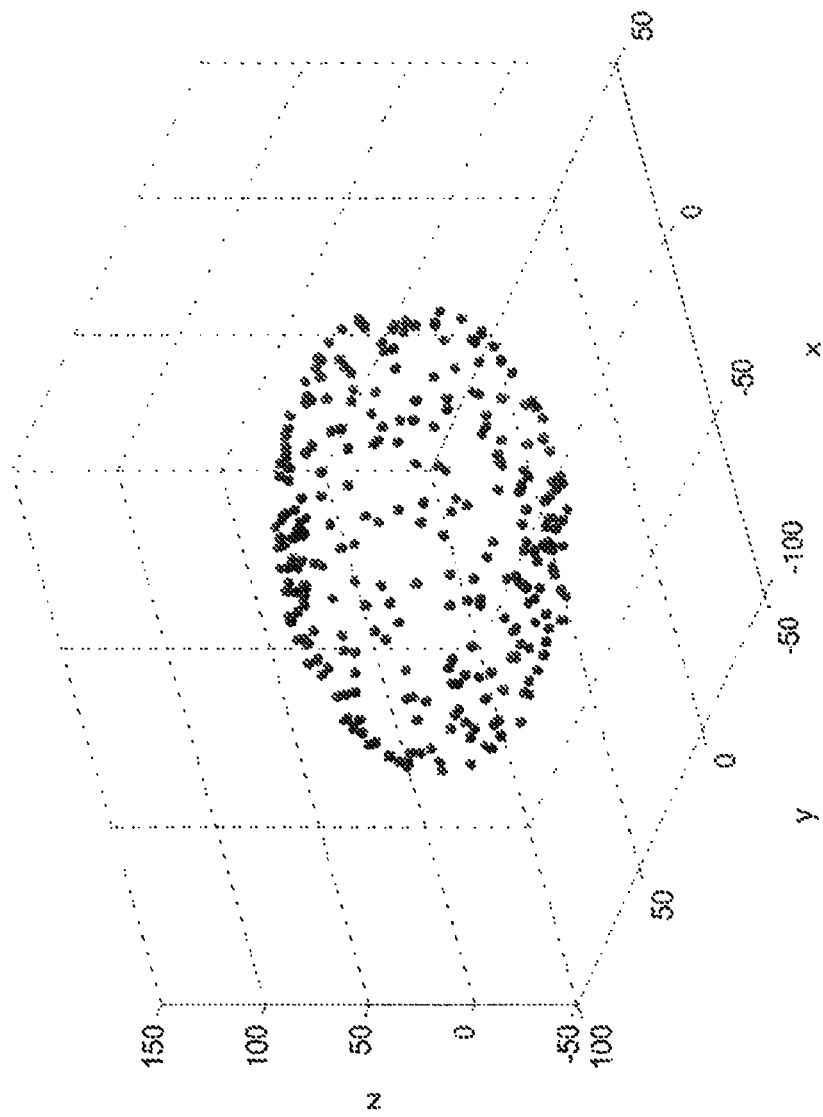
FIGS. 16 and 17 are data point graphs for illustrating effects of applying a least squares fitting algorithm to obtain the graph of FIG. 9.

To determine the estimated center, gains and angles from the T matrix, the following function may be used:
function [center gains angles]=calcTransformParams(T)
iT=inv(T);
gz=iT(3,3);
gy=sqrt(iT(2,2).^2+iT(2,3).^2);
sphi=−iT(2,3)/gy;
phi=asind(sphi);
gx=sqrt(sum(iT(1,1:3). ^2));
slambda=−iT(1,3)/gx;
lambda=asind(slambda);
srho=−iT(1,2)/gx/cosd(lambda);
rho=asind(srho);
center=iT(1:3,4)';
gains=[gx gy gz];
angles=[rho phi lambda];
end An example of 4-point and 9-point calibration is shown in FIG. 16. The points shown have an actual DC offset of (−30, 20,40), gains of (1,0.9,1.1), misalignment angles of (2,−3,0) degrees and a radius of 55.

Using the 4-point "fast" calibration, the following values can be estimated:
Estimated DC offset=(−29.8115, 19.9337, 38.8898)
Estimated radius=55.5717
And the transform matrix:

$$\begin{matrix} 1.0000 & 0 & 0 & 29.8115 \\ 0 & 1.0000 & 0 & -19.9337 \\ 0 & 0 & 1.0000 & -38.8898 \\ 0 & 0 & 0 & 1.0000 \end{matrix}$$

Figure 17:
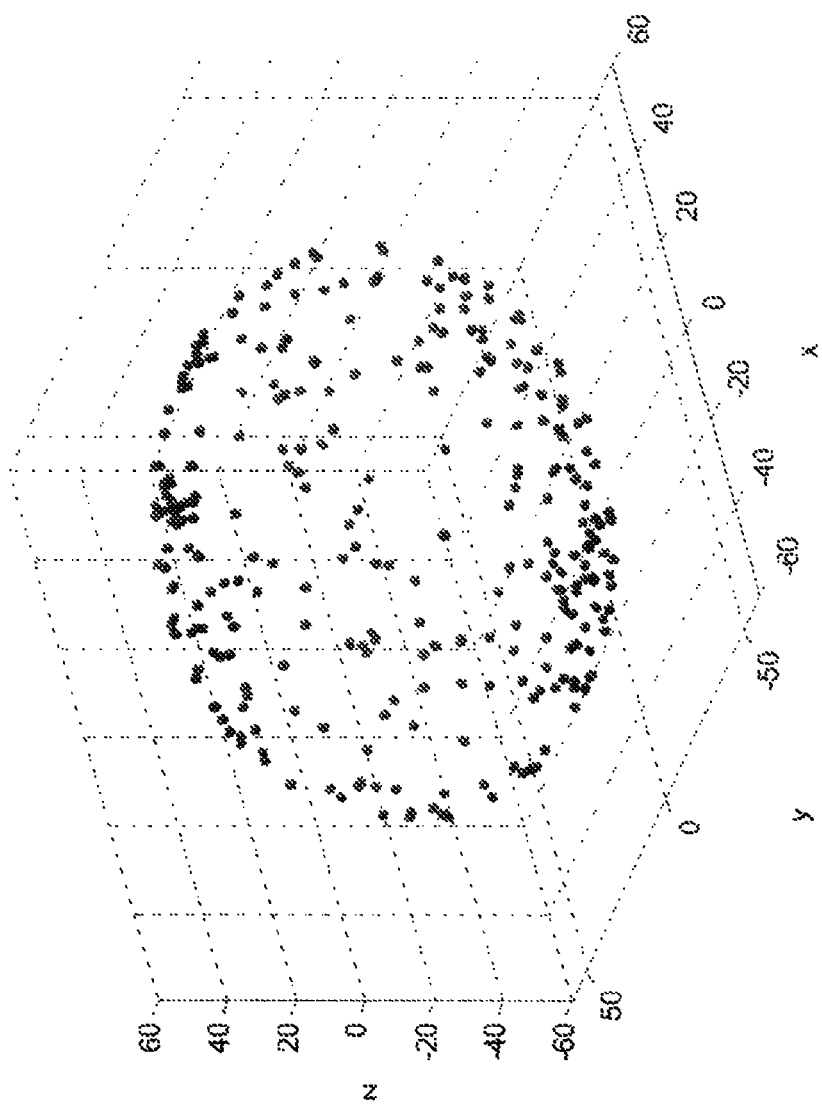

These parameters may then be used to correct the points as shown in FIG. 17.

Using the 9-point "full" calibration, the following values may be estimated:
Estimated DC offset=(−29.8796, 20.0476, 39.9490)
Estimated gains=(1.0074, 0.8972, 1.0963)
Estimated angles=(−2.1244, 2.6167, 0.0184)
And the transform matrix:

$$\begin{matrix} 0.9933 & -0.0414 & -0.0013 & 30.5589 \\ 0 & 1.1157 & 0.0417 & -24.0332 \\ 0 & 0 & 0.9122 & -36.4408 \\ 0 & 0 & 0 & 1.0000 \end{matrix}$$

When these parameters are used to correct the points of the above figure, the corrected data shown in FIG. 9 is obtained.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific embodiments, various modifications thereof will be apparent to those skilled in the art without departing from the scope of the claims appended hereto.

The invention claimed is:

1. A method of calibrating an accelerometer, the method comprising:
   using at least a first magnetometer reading to detect that a first orientation is being maintained;
   obtaining a plurality of accelerometer readings at the first orientation;
   using at least one other magnetometer reading to detect that a plurality of additional orientations are being maintained and, for each additional orientation, obtaining a plurality of accelerometer readings at that additional orientation;
   determining calibration parameters comprising, for each axis of the accelerometer, at least one of a gain value and an offset value, using the plurality of accelerometer readings at the first and plurality of additional orientations; and
   applying the calibration parameters to subsequent accelerometer readings.

2. The method according to claim 1, wherein detecting that the first and plurality of additional orientations are being maintained comprises determining that one or more values are being maintained substantially constant.

3. The method according to claim 2, wherein the one or more values are a function of both at least one magnetometer reading and at least one accelerometer reading.

4. The method according to claim 3, wherein the one or more values are vectors obtained by combining a magnetometer vector with an accelerometer vector.

5. The method according to claim 4, wherein a first vector is obtained by determining a cross product of the magnetometer vector and the accelerometer vector and a second vector is obtained by determining a cross product of the accelerometer vector and the first vector.

6. The method according to claim 1, further comprising determining if the magnetometer readings are of a sufficient quality before determining whether or not the first orientation is being maintained.

7. The method according to claim 1, further comprising checking whether or not the accelerometer readings are of sufficient quality prior to the determining and applying operations.

8. The method according to claim 7, wherein the checking comprises determining whether or not at least some of the accelerometer readings lie within a predetermined sphere.

9. The method according to claim 1, wherein the gain and offset values are determined by applying a least squares estimation using the plurality of accelerometer readings at the first and plurality of additional orientations.

10. A computer readable storage medium comprising computer executable instructions for obtaining data for calibrating an accelerometer, the computer executable instructions comprising instructions for:
   using at least a first magnetometer reading to detect that a first orientation is being maintained;
   obtaining a plurality of accelerometer readings at the first orientation;
   using at least one other magnetometer reading to detect that a plurality of additional orientations are being maintained and, for each additional orientation, obtaining a plurality of accelerometer readings at that additional orientation;
   determining calibration parameters comprising, for each axis of the accelerometer, at least one of a gain value and an offset value, using the plurality of accelerometer readings at the first and plurality of additional orientations; and
   applying the calibration parameters to subsequent accelerometer readings.

11. The computer readable medium according to claim 10, wherein detecting that the first and plurality of additional orientations are being maintained comprises determining that one or more values are being maintained substantially constant.

12. The computer readable medium according to claim 11, wherein the one or more values are a function of both at least one magnetometer reading and at least one accelerometer reading.

13. The computer readable medium according to claim 12, wherein the one or more values are vectors obtained by combining a magnetometer vector with an accelerometer vector.

14. The computer readable medium according to claim 13, wherein a first vector is obtained by determining a cross product of the magnetometer vector and the accelerometer vector and a second vector is obtained by determining a cross product of the accelerometer vector and the first vector.

15. The computer readable medium according to claim 10, further comprising instructions for determining if the magnetometer readings are of a sufficient quality before determining whether or not the first orientation is being maintained.

16. The computer readable medium according to claim 10, further comprising instructions for checking whether or not the accelerometer readings are of sufficient quality prior to the determining and applying operations.

17. The computer readable medium according to claim 16, wherein the checking comprises determining whether or not at least some of the accelerometer readings lie within a predetermined sphere.

18. The computer readable medium according to claim 10, wherein the gain and offset values are determined by applying a least squares estimation using the plurality of accelerometer readings at the first and plurality of additional orientations.

19. An electronic device comprising a processor, memory, an accelerometer, and a magnetometer, the memory comprising computer executable instructions for obtaining data for calibrating the accelerometer, the computer executable instructions comprising instructions for:
   using at least a first magnetometer reading to detect that a first orientation is being maintained;
   obtaining a plurality of accelerometer readings at the first orientation;
   using at least one other magnetometer reading to detect that a plurality of additional orientations are being maintained and, for each additional orientation, obtaining a plurality of accelerometer readings at that additional orientation;
   determining calibration parameters comprising, for each axis of the accelerometer, at least one of a gain value and an offset value, using the plurality of accelerometer readings at the first and plurality of additional orientations; and
   applying the calibration parameters to subsequent accelerometer readings.

20. The electronic device according to claim 19, wherein detecting that the first and plurality of additional orientations are being maintained comprises determining that one or more values are being maintained substantially constant.

21. The electronic device according to claim 20, wherein the one or more values are a function of both at least one magnetometer reading and at least one accelerometer reading.

22. The electronic device according to claim 21, wherein the one or more values are vectors obtained by combining a magnetometer vector with an accelerometer vector.

23. The electronic device according to claim 22, wherein a first vector is obtained by determining a cross product of the magnetometer vector and the accelerometer vector and a second vector is obtained by determining a cross product of the accelerometer vector and the first vector.

24. The electronic device according to claim 19, further comprising instructions for determining if the magnetometer readings are of a sufficient quality before determining whether or not the first orientation is being maintained.

25. The electronic device according to claim 19, further comprising instructions for checking whether or not the accelerometer readings are of sufficient quality prior to the determining and applying operations.

26. The electronic device according to claim 25, wherein the checking comprises determining whether or not at least some of the accelerometer readings lie within a predetermined sphere.

27. The electronic device according to claim 19, wherein the gain and offset values are determined by applying a least squares estimation using the plurality of accelerometer readings at the first and plurality of additional orientations.

* * * * *